United States Patent
Agafonov et al.

(10) Patent No.: US 12,537,394 B2
(45) Date of Patent: Jan. 27, 2026

(54) WIRELESS POWER TRANSFER

(71) Applicant: KONINKLIJKE PHILIPS N.V., Eindhoven (NL)

(72) Inventors: Aleksei Agafonov, Eindhoven (NL); Antonius Adriaan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/704,108

(22) PCT Filed: Nov. 4, 2022

(86) PCT No.: PCT/EP2022/080786
§ 371 (c)(1),
(2) Date: Apr. 24, 2024

(87) PCT Pub. No.: WO2023/083707
PCT Pub. Date: May 19, 2023

(65) Prior Publication Data
US 2025/0233456 A1  Jul. 17, 2025

(30) Foreign Application Priority Data
Nov. 10, 2021  (EP) ..................... 21207416

(51) Int. Cl.
H02J 50/12  (2016.01)
H02J 50/80  (2016.01)

(52) U.S. Cl.
CPC .............. *H02J 50/12* (2016.02); *H02J 50/80* (2016.02)

(58) Field of Classification Search
None
See application file for complete search history.

(56) References Cited

U.S. PATENT DOCUMENTS

2008/0161052 A1*  7/2008  Miyagawa ............... H04B 5/48
  455/558
2012/0249337 A1* 10/2012  Sekita ..................... H04L 69/40
  340/686.1

(Continued)

OTHER PUBLICATIONS

International Search Report and Written Opinion from PCT/EP2022/080786 mailed Feb. 8, 2023.

(Continued)

*Primary Examiner* — Daniel Kessie

(57) ABSTRACT

A power transmitter (101) provides power to a power receiver (105) via an inductive power transfer signal which is also used by the power receiver (105) for communication by load modulation. The power transmitter (101) comprises a load detector (209) detecting load variations for the power transfer signal and a preamble presence detector (213) correlates a second chip sequence with load variations and generates a preamble detection if the correlation exceeds a threshold. A load modulation receiver (207) determines load modulation data symbols based on a correlation of the first chip sequence and load variations of the power transfer signal. A synchronizer (215) synchronizes data symbol time intervals for the load modulation receiver (207) in response to a timing of the preamble detection, and the load modulation receiver (207) aligns the correlation of the first chip sequence and load variations to the data symbol time intervals. The power receiver (105) transmits the preamble and data symbols using the corresponding chip sequences.

11 Claims, 8 Drawing Sheets

(56) References Cited

U.S. PATENT DOCUMENTS

2014/0314193 A1\* 10/2014 Sung ................ H04L 7/007
  375/376
2019/0097459 A1  3/2019 Ettes

OTHER PUBLICATIONS

WPC Download the QI Specifications Wireless Power Consortium V1.3 Jan. 31, 2021 p. 1-2.

\* cited by examiner

WIRELESS POWER TRANSFER

CROSS-REFERENCE TO PRIOR APPLICATIONS

This application is the U.S. National Phase application under 35 U.S.C. § 371 of International Application No. PCT/EP2022/080786, filed on Nov. 4, 2022, which claims the benefit of EP Patent Application No. EP 21207416.5, filed on Nov. 10, 2021. These applications are hereby incorporated by reference herein.

FIELD OF THE INVENTION

The invention relates to wireless power transfer and in particular, but not exclusively, to wireless power transfer at higher power levels.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In order to support efficient wireless power transfer, wireless power transfer systems, such as Qi based systems, utilize substantial communication between the power transmitter and the power receiver. Initially, Qi supported only communication from the power receiver to the power transmitter using load modulation of the power transfer signal. However, developments of the standard have introduced bidirectional communication and many functions are supported by communication exchanges between the power receiver and the power transmitter. In many systems, the communication from the power transmitter to the power receiver is accomplished by modulating the power transfer signal.

In some systems, it has been proposed to use separate and dedicated communication functionality such as e.g. Bluetooth or NFC (Near Field Communication) based communication. However, whereas such approaches may tend to provide efficient operation in many scenarios it is also associated with a number of disadvantages, including requiring dedicated and complex communication circuitry and potentially a reduced certainty that the power transmitter is indeed communicating with the power receiver that is being supplied with power. Also, backwards compatibility, e.g. with Qi based devices, may be problematic for newer devices based on separate communication.

Communicating using load modulation of the power transfer signal transferring power to the power receiver may however also tend to have some associated disadvantages. For example, the load modulation may tend to introduce some electrical noise including both noise to the signals of the devices as well as radiated electromagnetic noise. The load modulation may increase electromagnetic interference to other devices and maintaining sufficient or optimal electromagnetic compatibility has been found to be challenging. It has also been found in practice that load modulation may result in the introduction of undesired spurious oscillations to the drive signal and the power transfer signal. Another disadvantage is that the load modulation of the power transfer signal may result in acoustic noise. Such noise may result from the impact on mechanical elements of the variations to the electromagnetic field caused by the load modulation, and specifically it may cause mechanical elements to move and vibrate resulting in potential acoustic noise being generated.

Although it may in some ways be desired to change to a different communication approach maintaining backwards compatibility or reducing the amount of change needed for existing designs and approaches is a prime challenge that often renders this unattractive.

Hence, an improved approach would be advantageous, in particular, an approach allowing increased flexibility, reduced cost, reduced complexity, improved power transfer operation, increased reliability, reduced communication errors, improved backwards compatibility, improved electromagnetic compatibility, reduced electrical and/or acoustic noise, improved communication, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal; the power transmitter comprising: an output circuit comprising a transmitter coil arranged to generate the power transfer signal in response to a drive signal being applied to the output circuit; a driver arranged to generate the drive signal; a load detector for detecting load variations for the power transfer signal; a store for storing a first chip sequence and a second chip sequence, the second chip sequence having a length exceeding a length of the first chip sequence; a preamble presence detector arranged to correlate the second chip sequence with load variations of the power transfer signal to generate detection correlation values and to generate a preamble detection in response to a detection correlation value exceeding a preamble detection threshold; a load modulation receiver arranged to determine load modulation data symbols received from the power receiver following the preamble detection in response to a correlation of the first chip sequence and load variations of the power transfer signal; a synchronizer arranged to synchronize data symbol time intervals for the load modulation receiver in response to a timing of the preamble detection, and wherein the load modulation receiver is arranged to align the correlation of the first chip sequence and load variations of the power transfer signal to the data symbol time intervals.

The invention may provide improved performance in many embodiments and may in particular in many embodiments provide improved communication between a power receiver and a power transmitter. It may provide improved power transfer in many embodiments.

The approach may allow improved communication, and in many embodiments may allow improved trade-off between different parameters and operating characteristics. The approach may e.g. allow highly reliable communication yet allow reduced modulation depth to be used. The approach may reduce electric noise and/or electromagnetic interference and provide improved electromagnetic compatibility. The approach may in many cases reduce or prevent acoustic noise.

The approach may in many scenarios provide an improved trade-off between different parameters including computational resource requirements, data detection accuracy, bit error rate, data rate. The approach may switch between different chip sequences with different lengths for different purposes thereby providing differentiated optimization. The approach may provide improved data detection and synchronization which may lead to more reliable communication.

The approach may provide advantageous backwards compatibility and e.g. may allow relatively easy modification of existing approaches, such as those used by the Qi Specifications. The approach may reuse much functionality from such existing approaches. The approach may allow for low complexity implementation yet provide highly efficient performance. The communication approach may be particularly advantageous for use in power transfer systems as bandwidth considerations may be less critical in such systems.

A chip sequence may be a sequence/pattern of modulation load values. Each of these modulation load values may be constant within a chip duration. Chip sequences for different data symbols have different sequences/patterns of modulation load values.

In many embodiments, the length of the first chip sequence is not below 15 and not above 128 chips. In many embodiments, the length of the second chip sequence is not below 31 and not above 256 chips.

In some embodiments, the first chip sequence may be a chip sequence out of a plurality of data symbol chip sequences, each chip sequence being linked with a data symbol. The load modulation receiver may be arranged to determine load modulation data symbols received from the power receiver following the preamble detection in response to correlations of each of the plurality of data symbol chip sequences and load variations of the power transfer signal.

A data symbol time interval is a time interval in which a data symbol is received. A data symbol time interval may have a duration equal to a duration of the first chip sequence. The alignment of the correlation of the first chip sequence and load variations of the power transfer signal to the data symbol time intervals may be such that the first chip sequence is correlated with load variations of the power transfer signal that are within one data symbol time interval. The alignment may be such that a first chip of the first chip sequence is aligned with a load variation sample occurring within a first symbol time interval and such that a second chip of the first chip sequence is aligned with a load variation sample (also) occurring within the first symbol time interval.

The preamble presence detector may correlate the second chip sequence with a sequence of samples of load variations of the power transfer signal to generate detection correlation values. The correlation may be performed for different (time) alignments/offsets between the second chip sequence and the load variations/the sequence of samples of the load variations.

The preamble presence detector may be arranged to determine that a detection of a preamble has occurred in response to a detection correlation value exceeding a preamble detection threshold.

The load modulation receiver may be arranged to correlate the first chip sequence with load variations of the power transfer signal to generate symbol detection correlation values. The load modulation receiver may correlate the first chip sequence with a sequence of samples of load variations of the power transfer signal to generate detection correlation values. The correlation may be performed for different (time) alignments/offsets between the first chip sequence and the load variations/the sequence of samples of the load variations. The load modulation receiver may determine load modulation data symbols dependent on the symbol detection correlation values. In many embodiments, a load modulation data symbol may be determined as a given data symbol if a symbol detection correlation value exceeds a threshold. The threshold may be dynamic and may e.g., be determined based on other correlations or symbol detection correlation values. For example, if multiple symbol detection correlation values are determined e.g. for different symbol chip sequences, a symbol value may be determined by a comparison of different symbol detection correlation values determined for the same data symbol time interval.

The determination of data symbol values may in many embodiments be more complex than simply comparing a correlation result to a single fixed threshold (although this is of course possible). For example, comparisons may be made between correlations between different sequence values in cases where different data symbols may be encoded by different bit sequences. Further, a simple comparison to a single threshold may be inappropriate in cases where soft decision detection is performed. It is noted that such soft decision detection is a standard approach for communication, including Direct Sequence Spread Spectrum (DSSS) communication. For example, it is frequently used when error correcting coding is employed.

The load modulation receiver may be arranged to determine load modulation data symbols in response to a correlation of the first chip sequence and load variations of the power transfer signal following the preamble detection.

The synchronization may be such that the first sequence is applied within a data symbol time interval.

The load modulation receiver may be arranged to align the correlation of the first chip sequence with load variations of the power transfer signal to the data symbol time intervals by aligning the first chip sequence with load variations in data symbol time intervals of the power transfer signal.

In some embodiments, the load modulation receiver may be arranged to determine a first received data symbol value if the correlation value for the correlation of the first chip sequence and load variations of the power transfer signal in a first data symbol time interval exceeds a data symbol threshold.

In accordance with an optional feature of the invention, the synchronizer is arranged to determine the data symbol time intervals as repeating time intervals having a duration equal to a duration of the first chip sequence and having a predetermined time offset to the preamble detection.

This may allow low complexity implementation and/or improved performance and/or operation in many scenarios.

The predetermined time offset may specifically be a zero time offset. The predetermined time offset may specifically be a time offset of an integer number of chip time intervals/durations.

In accordance with an optional feature of the invention, the length of the second chip sequence is no less than twice the length of the first chip sequence.

This may allow particularly advantageous implementation and/or operation.

In accordance with an optional feature of the invention, a chip rate for the first chip sequence is higher than a chip rate for the second chip sequence.

This may allow improved performance and/or facilitated implementation in many embodiments. In many embodiments it may allow reduced computational requirements.

In accordance with an optional feature of the invention, a chip rate for the first chip sequence is lower than a chip rate for the second chip sequence.

This may allow improved performance and/or facilitated implementation in many embodiments. In many embodiments it may allow high data rate yet improved detection performance.

In accordance with an optional feature of the invention, the load modulation receiver is arranged to determine a first received data symbol value if the correlation value for the correlation of the first chip sequence and load variations of the power transfer signal in a first data symbol time interval exceeds a data symbol threshold, the data symbol threshold being lower than the preamble detection threshold.

This may allow a particularly efficient and high performance data detection operation.

In accordance with an optional feature of the invention, the modulation receiver is arranged to determine binary data symbol values corresponding to a sign of the correlation of the first chip sequence and load variations of the power transfer signal in the data symbol time intervals.

This may allow a particularly efficient and high performance data detection operation. A low complexity data detection can be used which in combination with the synchronization of the correlation may still provide reliable performance in many scenarios.

In accordance with an optional feature of the invention, the preamble presence detector is arranged to correlate load variations of the power transfer signal with a third chip sequence being a subset of the second chip sequence, and to initiate a correlation of the power transfer signal with the second chip sequence in response to a detection that a correlation value for the correlation between load variations of the power transfer signal with a third chip sequence exceeds a detection threshold.

This may in many embodiments allow substantially reduced computational resource usage while still providing reliable and accurate preamble detection.

In some embodiments, a length of the third chip sequence is no longer than a quarter of a length of the second chip sequence.

In some embodiments, the third chip sequence comprises at least some non-contiguous chips of the second chip sequence.

The preamble presence detector may be arranged to only initiate a correlation of the power transfer signal with the second chip sequence if a correlation value for the correlation of the load variations of the power transfer signal with a third chip sequence exceeds a detection threshold.

In accordance with an optional feature of the invention, the third chip sequence is a subset of the second chip sequence having an autocorrelation higher than any autocorrelation of any chip sequence of contiguous chips of the second chip sequence with a length equal to a length of third chip sequence.

This may provide improved operation and/or performance in many embodiments.

In accordance with an optional feature of the invention, the preamble presence detector is arranged to synchronize the second chip sequence to the drive signal when correlating the second chip sequence with load variations of the power transfer signal.

This may provide improved operation and/or performance in many embodiments.

In accordance with an optional feature of the invention, the preamble presence detector is arranged to generate a noise estimate for the power transfer signal, and to adapt the preamble detection threshold in response to the noise estimate.

This may provide improved operation and/or performance in many embodiments.

According to an aspect of the invention there is provided a power receiver for wirelessly receiving power from a power transmitter via an inductive power transfer signal; the power receiver comprising: an input circuit comprising a receiver coil arranged to extract power from the power transfer signal; a store arranged to store a first chip sequence and a second chip sequence, the second chip sequence having a length exceeding a length of the first chip sequence; a preamble transmitter arranged to transmit a preamble by load modulating the power transfer signal by load variations corresponding to the second chip sequence; a data transmitter arranged to transmit data symbols to the power transmitter by load modulating the power transfer signal following transmission of the preamble, at least one data symbol being represented by a sequence of modulation load values corresponding to the first chip sequence; a synchronizer arranged to synchronize data symbol time intervals for the data transmitter with a timing of the transmission of the preamble, and wherein the data transmitter is arranged to align the sequence of modulation load values corresponding to the first chip sequence to the data symbol time intervals.

According to an aspect of the invention there is provided a wireless power transfer system comprising a power transmitter and a power receiver as mentioned above.

According to an aspect of the invention there is provided a method of operation for a power transmitter wirelessly providing power to a power receiver via an inductive power transfer signal; the power transmitter comprising:

an output circuit comprising a transmitter coil arranged to generate the power transfer signal in response to a drive signal being applied to the output circuit; the method comprising: generating the drive signal; detecting load variations for the power transfer signal; correlating a second chip sequence with load variations of the power transfer signal to generate detection correlation values, the second chip sequence having a length exceeding a length of a first chip sequence; generating a preamble detection in response to a detection correlation value exceeding a preamble detection threshold; determining load modulation data symbols received from the power receiver following the preamble detection in response to a correlation of the first chip sequence and load variations of the power transfer signal; synchronizing data symbol time intervals in response to a timing of the preamble detection, and aligning the correlation of the first chip sequence and load variations of the power transfer signal to the data symbol time intervals.

According to an aspect of the invention there is provided method of operation for a power receiver wirelessly receiving power from a power transmitter via an inductive power transfer signal; the power receiver comprising: an input circuit comprising a receiver coil arranged to extract power from the power transfer signal; and the method comprising: transmitting a preamble by load modulating the power transfer signal by load variations corresponding to a second chip sequence the second chip sequence having a length exceeding a length of a first chip sequence; transmitting data symbols to the power transmitter by load modulating the power transfer signal following transmission of the preamble, at least one data symbol being represented by a sequence of modulation load values corresponding to the first chip sequence; synchronizing data symbol time intervals for the data transmitter with a timing of the transmission of the preamble, and aligning the sequence of modulation load values corresponding to the first chip sequence to the data symbol time intervals.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a high power wireless power transfer system utilizing a power transfer approach such as known from the Qi Specification. However, it will be appreciated that the invention is not limited to this application but may be applied to many other wireless power transfer systems.

Figure 1:
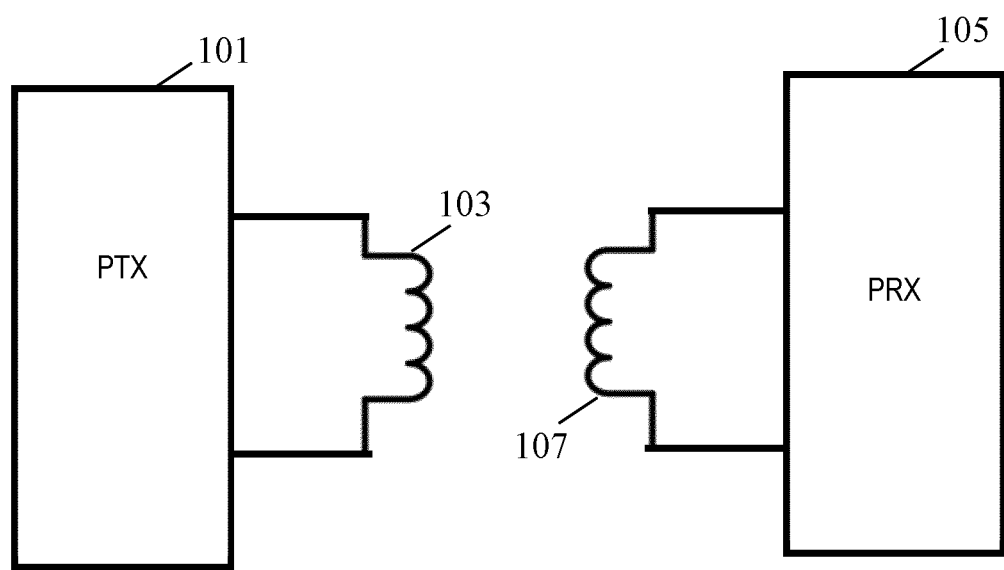
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and in many practical systems may be around 120-120 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

In the following, the operation of the power transmitter 101 and the power receiver 105 will be described with specific reference to an embodiment generally in accordance with the Qi Specifications (except for the herein described (or consequential) modifications and enhancements).

Many wireless power transfer systems utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The power receiver sends this error signal to the power control function in the power transmitter to reduce the static error, ideally to zero.

Figure 2:
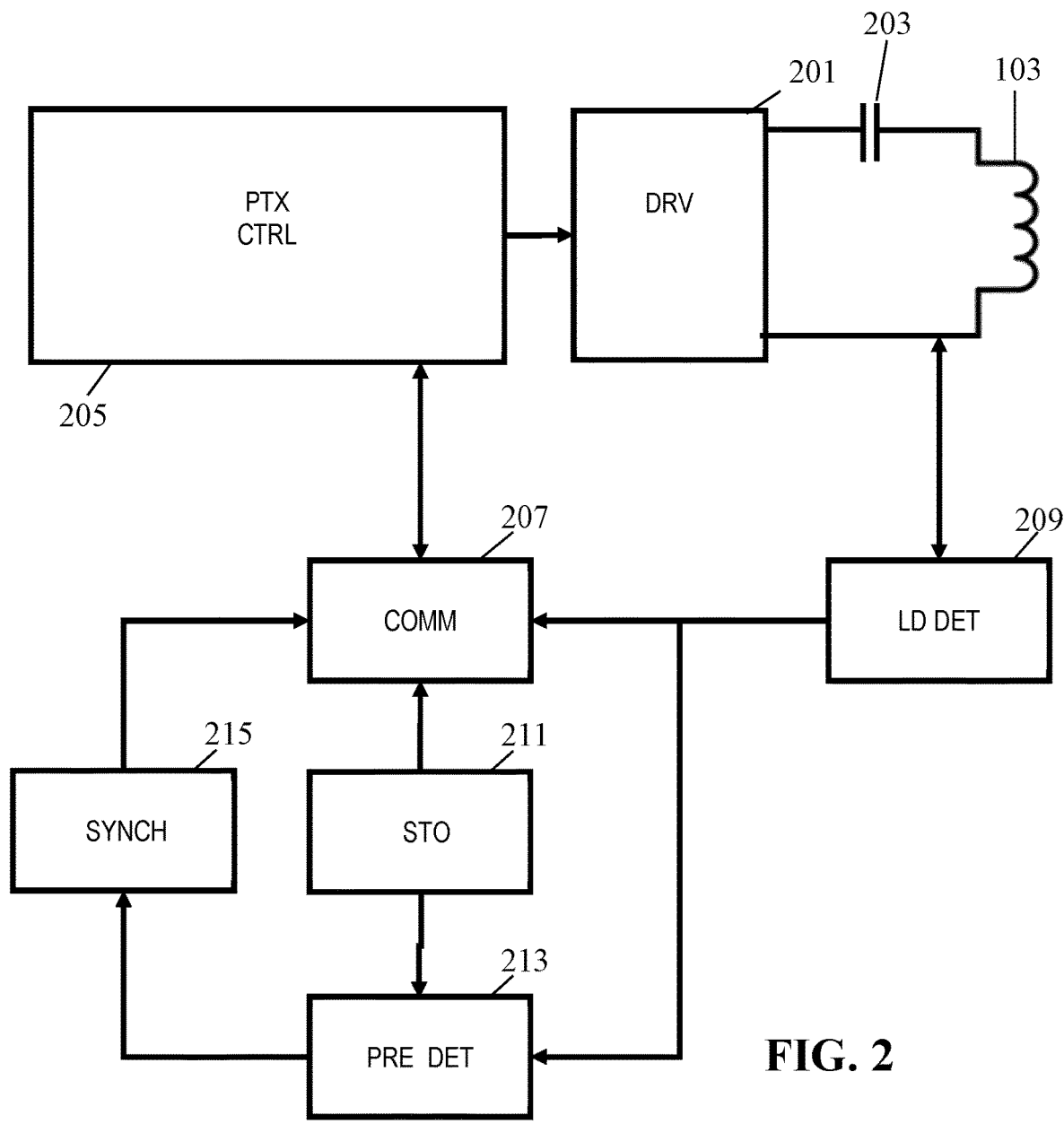
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 203. In the example, the output resonance circuit is a series resonance circuit, but it will be appreciated that in other embodiments, the output resonance circuit may be a parallel resonance circuit. It will be appreciated that any suitable resonance circuit may be used including one using multiple inductors and/or capacitors.

Figure 3:
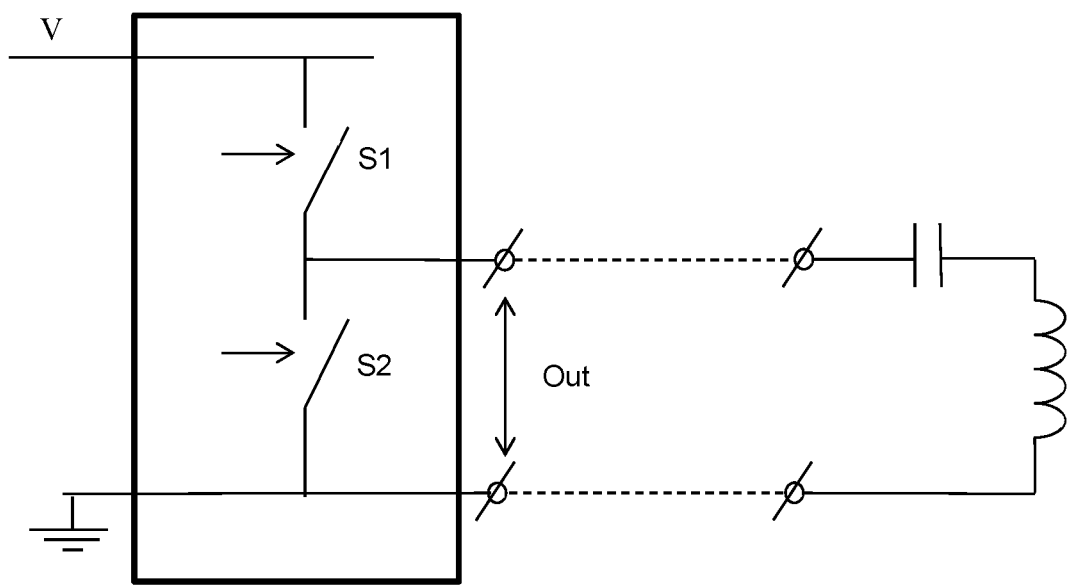
FIG. 3 illustrates an example of a half bridge inverter for a power transmitter.
Figure 4:
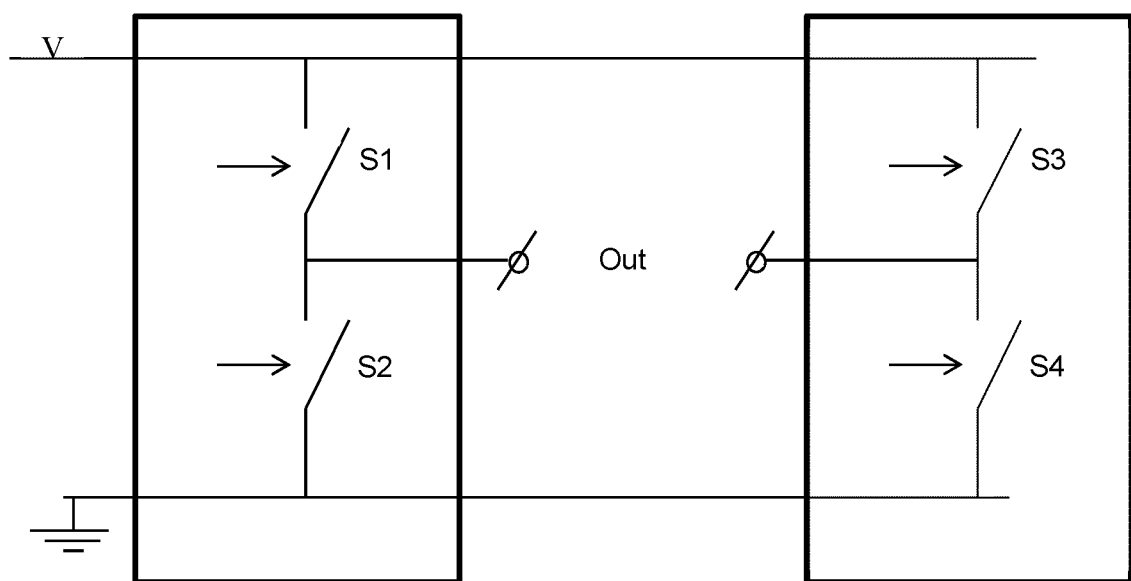
FIG. 4 illustrates an example of a full bridge inverter for a power transmitter.

The driver 201 generates the current and voltage which is fed to the output resonance circuit and thus to the transmitter coil 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 205 which is arranged to control the operation of the power transmitter 101 in accordance with the desired operating principles. Specifically, the power transmitter 101 may include many of the functionalities required to perform power control in accordance with the Qi Specification.

The power transmitter controller 205 is in particular arranged to control the generation of the drive signal by the driver 201, and it can specifically control the power level of the drive signal, and accordingly the level of the generated power transfer signal. The power transmitter controller 205 comprises a power loop controller controlling a power level of the power transfer signal in response to the power control messages received from the power receiver 105 during the power transfer phase.

Figure 5:
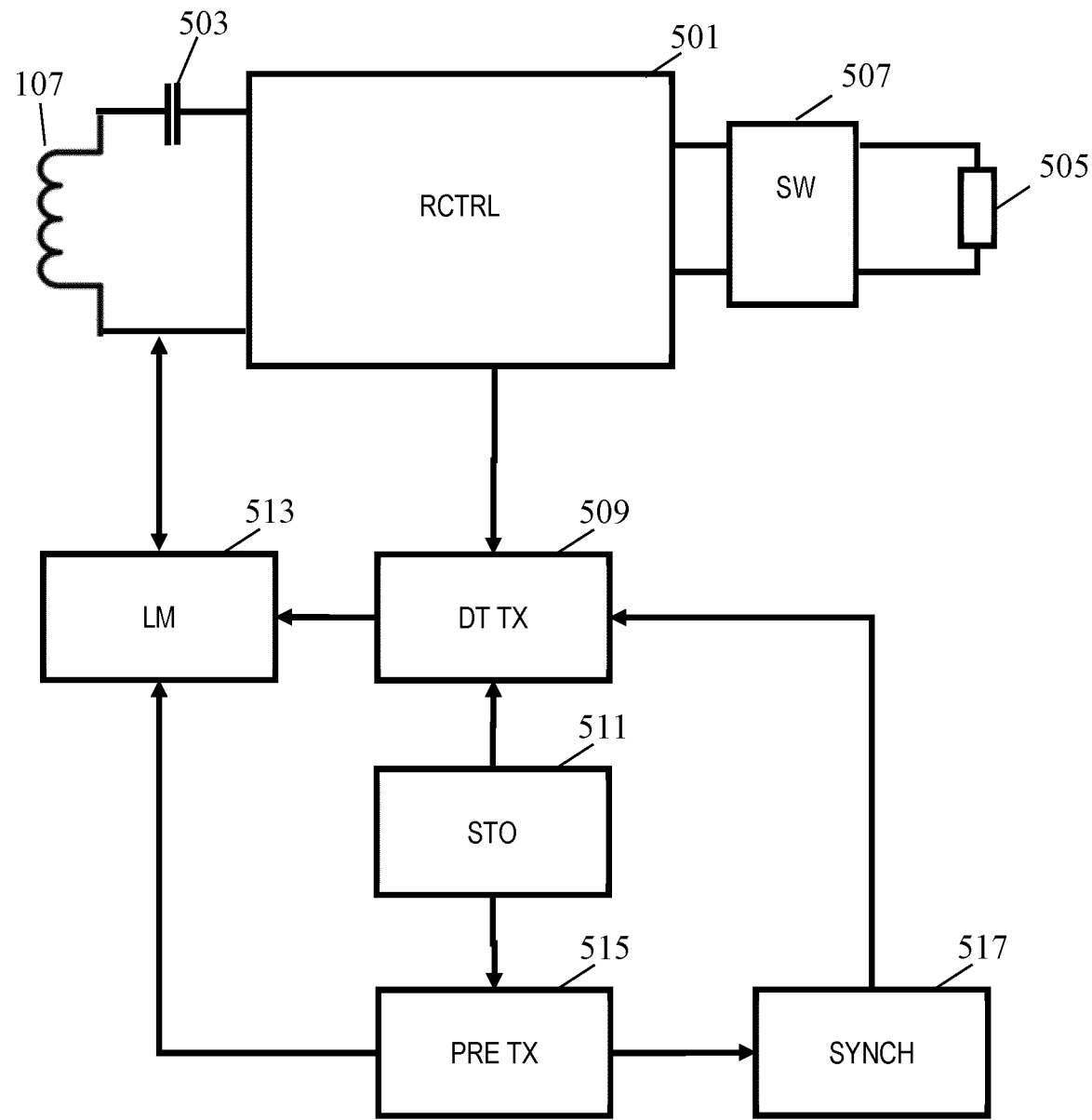
FIG. 5 illustrates an example of elements of a power receiver in accordance with some embodiments of the invention.

FIG. 5 illustrates some exemplary elements of the power receiver 105.

In the example, the receiver coil 107 is coupled to a power receiver controller 501 via a capacitor 503 which together with the receiver coil 107 forms an input resonance circuit. Thus, the power transfer may be a resonant power transfer between resonance circuits. In other embodiments, only one, or none, of the power receiver and the power transmitter may utilize a resonance circuit for power transfer.

The power receiver controller 501 couples the receiver coil 107 to a load 505 via a switch 507. The power receiver controller 501 includes a power control path which converts the power extracted by the receiver coil 107 into a suitable supply for the load 505. In some embodiments, the power receiver controller 501 may provide a direct power path which simply connects the input resonance circuit to the switch 507 or load 505, i.e. the power path of the power receiver controller 501 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 507 may only be present in some embodiments and that in some embodiments the load 505 may permanently be coupled to the input resonance circuit.

In addition, the power receiver controller 501 may include various power receiver controller functionality required to perform power transfer, and in particular functions required to perform power transfer in accordance with the Qi Specifications.

In order to provide efficient operation, the power transmitter and power receiver are arranged to communicate and exchange data with each other. The following description will focus on the communication of data from the power receiver to the power transmitter but it will be appreciated that most practical systems, including the examples described, will comprise functionality for communicating from the power transmitter to the power receiver. It will also be appreciated that many techniques and approaches for such communication are known and that any suitable approach can be used. For example, many typical approaches the power transmitter is specifically arranged to communicate with the power receiver using the power transfer signal as a communication carrier. In particular, communication from the power transmitter to the power receiver may be by frequency, phase and/or amplitude modulation of the power transfer signal. The power receiver may evaluate the signal induced in the receiver coil 107 (from the power transfer signal) and demodulate this according to the modulation used thereby extracting data transmitted in the forward direction (from power transmitter to power receiver).

In the reverse direction from the power receiver to the power transmitter, the power receiver may load modulate the power transfer signal to communicate data to the power transmitter.

As will be well known to the skilled person, for load modulation, changes in the loading of the power transfer signal may be introduced by the power receiver where the changes are in accordance with data values to be transmitted. These changes can then be detected by the power transmitter in order to decode the data from the power receiver.

Load modulation may be used as the method for the power receiver to communicate control messages, or other data, to the power transmitter in Qi wireless power standard. There are typically two main ways of performing load modulation, namely either to directly change the resistive load/power extraction of the input circuit and/or to detune the resonance of the input circuit e.g. by changing a reactive loading of the input circuit (typically switching a capacitor in/out in line with data to be transmitted). Similar approaches may be used by the power receiver for load modulating the power transfer signal, and detection approaches as known for Qi may be used to detect the load variations at the power transmitter side. For example, a direct measurement of a power level or current amplitude of the drive signal may be used as indications of the loading, and thus load modulation variations, by the power receiver as will be known to the skilled person.

The power receiver 105 comprises a data transmitter 509 which is arranged to transmit data to the power transmitter by load modulating the power transfer signal. For example, the data transmitter 509 may be arranged to switch in/out a communication capacitor e.g. positioned in parallel with the power receiver controller 501 or with the resonance capacitor 503 thereby being able to vary the resonance frequency and the loading of the power transfer signal.

The data transmitter 509 may be coupled to the power receiver controller 501 and may be arranged to receive data from the power receiver controller 501 for transmission to the power transmitter. For example, the first power receiver may receive power error control data from the power receiver controller 501 and may transmit corresponding power error control messages to the power transmitter 101 using load modulation.

The power transmitter 101 comprises a load modulation receiver 207 which is arranged to receive the load modulation from the data transmitter 509. Thus, the power receiver 105 is arranged to transmit data to the load modulation receiver 207 by load modulating the power transfer signal.

In operation, the system is arranged to control the drive signal such that the power transfer signal attains suitable operating parameters/properties and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

At regular, and typically frequent, intervals, the power receiver transmits a power control error message to the power transmitter. In some embodiments, a direct power setpoint change message may be transmitted indicating a desired absolute power level (rather than a relative error message). The power receiver 105 comprises functionality for supporting such a power control loop, e.g. the power receiver controller 501 may continuously monitor the power or voltage of a load signal provided to the load and detect whether this is above or below a desired value. It may at regular intervals generate a power control error message which requests that the power level of the power transfer signal is increased or decreased, and it may transmit this power control error message to the power transmitter. Such error control messages, as well as other messages, may be transmitted by load modulation.

Load modulation may provide advantageous operation in many systems and applications and tends to provide reliable and low complexity operation suitable for power transfer systems where a power transfer signal is generated for the purpose of transferring power. The reuse of the power transfer signal as a communication carrier may typically reduce complexity and require less circuitry thereby reducing cost.

However, load modulation as used in e.g. Qi also has some associated disadvantages. Such disadvantages may e.g. be related to issues such as electromagnetic compatibility, communication quality (bit error rate), and audible noise.

The load modulation may create additional components in the electromagnetic spectrum causing additional electromagnetic interference and electrical noise. Also, it has been found that in many cases, the changes to the electromagnetic field caused by the load modulation may cause mechanical forces and movement that result in audible noise. It has also been found that strong load modulation may disturb the energy balance in the wireless power system, resulting in spurious oscillations within the communication carrier spectrum. In the presence of spurious oscillations, the wireless power transmitter often cannot properly demodulate the signal and therefore it has to interrupt power delivery to maintain safe operations.

The problems tend to be exacerbated for higher power transfer levels. Indeed, as the power levels of the power transfer signal increase, it is typically required that the load change for load modulation increases as well. Typically, the load modulation is required to be a suitable fraction of the power level, or maximum power level, of the power transfer signal. For example, the load modulation caused by the load modulation may be required to have a magnitude of no less than e.g. about 1% of the general loading of the power receiver (i.e. the load variation for the receiver coil caused by the load modulation may be required to be no less than 1% of the total load of the receiver coil 107). Qi was originally introduced for lower power applications of less than 5 W or so. For such lower power levels, the impact of the load modulation disadvantages is relatively manageable or even substantially insignificant. However, the maximum power levels for Qi have been increased to currently a maximum value of 15 W and work is ongoing to increase this further to a maximum level of 45 W. However, for such power levels, the above mentioned disadvantages tend to be significant, and they may provide a major obstacle to the further development of the Qi Specifications.

The system of FIGS. 1, 2, and 5 utilize an approach which in many situations may address one or more of the issues associated with load modulation. In the approach, load modulation is employed, but each symbol is represented by a chip sequence comprising a plurality of chips, and typically with a sequence comprising 15 to 127 chips. Thus, rather than simply varying the load in accordance with each symbol or bit, the data transmitter 509 is arranged to transmit a given symbol (typically bit) by a series of load changes and variations where the changes and variations are different for each symbol. Specifically, a chip sequence may be defined for each symbol and when transmitting a given symbol, the data transmitter 509 may retrieve the chip sequence for that specific symbol and proceed to load modulate the power transfer signal in accordance with the chip sequence for the symbol.

Similarly, the load modulation receiver 207 may detect the load modulation by considering the whole sequence, and specifically may seek to determine the receive symbol as the one for which the detected load variation pattern most closely matches the chip sequence pattern for that symbol.

The communication from the power receiver to the power transmitter is specifically based on Spread Spectrum, and in particular Direct Sequence Spread Spectrum (DSSS), communication. The communication is based on spreading data symbols using appropriate chip sequences at the data transmitter of the power receiver and de-spreading them by correlation with corresponding chip sequences at a data receiver of the power transmitter. Each data symbol may accordingly be encoded by a chip sequence comprising a plurality of chips. In some cases, each chip may correspond to a constant segment of the chip sequence. In many embodiments, the chip sequence is divided into a plurality of chip time intervals and the levels of the chip sequence can only vary between chip time intervals. The chip time intervals may typically all have the same duration. A chip may refer to a pulse of a direct-sequence spread spectrum sequence, such as a pseudo-random noise (PN) code sequence used for spreading of data symbols communicated using direct-sequence modulation. A chip may refer to a fixed-sized element of a chip sequence used for spreading of data symbols communicated using direct-sequence modulation.

Such an approach may in particular allow the modulation depth, i.e. the magnitude of the load variations to be reduced substantially which may for example reduce electromagnetic noise and interference, may reduce acoustic noise, and may reduce spurious oscillations. It may also in many embodiments result in improved signal to noise ratios and may result in a substantially improved and often more reliable communication with e.g. often a lower bit error rate. Thus, a general overall improved power transfer can be achieved.

In many embodiments, binary communication may be used where only two data symbol values are possible (corresponding to a "0" bit value or a "1" bit value). In such cases, one bit value may be represented by a given chip sequence and the other bit value may be associated with the inverse bit sequence, i.e. the bit sequence that results from changing each chip value to the opposite value. The two bit sequences are thus typically complementary with one resulting from the other by multiplication by −1 (with the chip values being represented by +1 and −1).

A particular advantage in such a case is that demodulation is particularly easy as a single correlation can be used to differentiate between the bit values as the magnitude of the correlation is the same for the chip sequences but the signs of the correlation values are opposite.

The following description will focus on such binary communication, but it will be appreciated that the invention is not limited only to binary communication.

Figure 6:
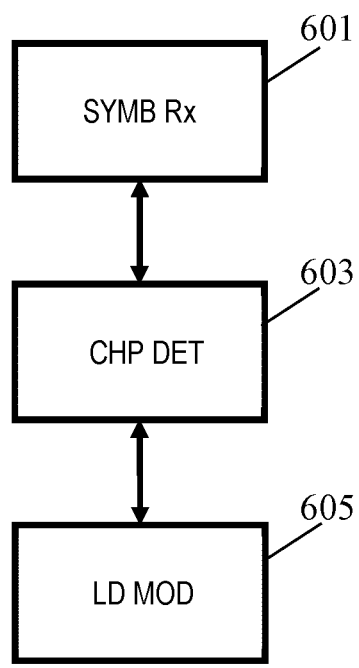
FIG. 6 illustrates an example of elements of a communicator for a power transmitter in accordance with some embodiments of the invention.

FIG. 6 illustrates an example of some elements of the data transmitter 509. The data transmitter 509 specifically comprises a symbol receiver 601 which is arranged to receive data symbols to be transmitted to the power transmitter. For example, error control data symbols for transmission to the power transmitter may be received from the power receiver controller 501. Typically, the data symbols are binary but in some cases higher order modulation symbols may be used (i.e. with more than two possible values). In some cases, such higher order data symbols may correspond to a combination of received data bits. For example, two bits may be combined into a single quaternary data symbol. Such combination may be possible both when the data bits are related and when they are e.g. completely independent.

The symbol receiver 601 is coupled to a chip determiner 603 which is arranged to determine a chip sequence assigned for the received data symbol. The data transmitter 509 is specifically coupled to a chip sequence store 511 in which the different chip sequences for different data symbols are stored. The chip sequence store 511 may store a set of reference chip sequences where each reference chip sequence is linked to a specific data symbol value. The chip determiner 603 may in response to receiving a data symbol for transmission proceed to retrieve the corresponding chip sequence from the chip sequence store 511.

Figure 7:
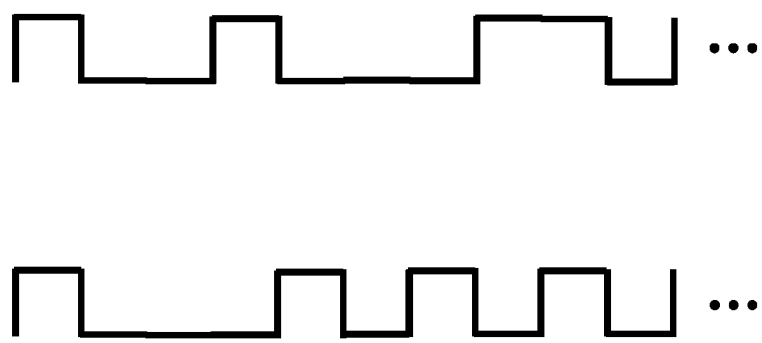
FIG. 7 illustrates an example of chip sequences.

FIG. 7 illustrates an example of parts of two possible chip sequences. Each chip sequence comprises a sequence of chips with each chip having constant modulation load level selected from a set of modulation levels. Typically, the set of modulation levels is two, corresponding to a binary chip sequence where the modulation load levels may switch between two possible levels. A symbol time is thus divided into a plurality of chip intervals with the modulation load level for each chip interval being selected from a predetermined set of modulation load levels and with the modulation load level sequences of the chips being different for different chip sequences. Typically, each sequence includes at least ten chips, and often substantially more. In many embodiments, each chip sequence may have a length of $2^N-1$ where N is an integer of typically no less than 4.

Longer chip sequences may provide improved noise suppression etc. but may also reduce the data rate as the symbol time increases for a given chip rate. Increased chip sequence lengths also increase complexity and resource demand, especially at the receiver where correlation with longer sequences may substantially require the number of computations required. A typical suitable value is N=5 and this a chip length of 31 chips.

Each of the stored chip sequences is assigned to a data symbol. Thus, each possible data symbol value that may need to be transmitted to the power transmitter may have a linked/associated chip sequence. For example, where only two data symbols are possible, i.e. where a binary communication is implemented, the set of chip sequences may comprise only two chip sequences. In this case, the chip sequences may as previously mentioned be the inverse of each other, and specifically one may arise from multiplication of the other by −1.

It will be appreciated that such a binary approach with two inverse chip sequences being used is equivalent to considering that the two possible binary values are modulated by the same chip sequence but with the data symbols having opposite data values (e.g. +1 and −1).

When the power receiver is about to transmit a data symbol, the value is fed to the symbol receiver 601 from the power receiver controller 501 and then to the chip determiner 603 which proceeds to determine the chip sequence that is linked to the data value to be transmitted by retrieving this from the chip sequence store 511. In the binary case, this chip sequence may be generated by multiplying a common stored chip sequence and the symbol value.

The determined chip sequence is then fed to a load modulator controller 605 which is arranged to control a load modulator 513 of the power receiver 105 to modulate the appropriate chip sequence on the power transfer signal. In the example, load modulator 513 may be arranged to switch in and out (on/off) a modulation load in accordance with the chips of the chip sequence, i.e. the load may be changed in accordance with the modulation load values of the chip sequence. Typically, the load modulator 513 may be arranged to switch in/out a communication capacitor e.g. positioned in parallel with the power receiver controller 501 or with the resonance capacitor 503 thereby being able to vary the resonance frequency and the loading of the power transfer signal.

Thus, in the example, each symbol (typically bit) time interval is divided into a plurality of (of typically 31) chip intervals with the modulation load being constant within each chip interval and with the modulation loads varying (changing or not changing) between chip intervals in accordance with a pattern which is different for each data symbol.

In order to receive the load modulation, the power transmitter comprises a load detector 209 which is arranged to detect load variations of the power transfer signal, and specifically it may determine a load variation sequence of the power transfer signal and/or drive signal. The load variation sequence may thus correspond to the received chip sequences when data is being transmitted. For example, the load value of the drive signal (e.g. the current and/or power)

may be measured and sampled at time intervals corresponding to the chip intervals during a time when a message is (expected to be) received from the power receiver. In some cases, the values may be normalized and quantized, e.g. if binary chip sequences are used, the load detector may generate a sequence of binary values e.g. representing a higher load and a lower load. Thus, a received chip sequence of load modulation is generated from the sampling of the signal(s) of the output circuit.

The load detector 209 is coupled to the load modulation receiver 207 to which it provides the received chip sequence of modulation load values. The load modulation receiver 207 is further coupled to a receive chip sequence store 211. The receive chip sequence store 211 stores a set of reference chip sequences which specifically correspond to the chip sequences stored and used by the power receiver. Thus, the power transmitter 101 comprises a local representation of the chip sequences used by the power receiver. The receive chip sequence store 211 comprises a set of reference chip sequences with each reference chip sequence being linked to a specific data symbol. Thus, the power receiver and the power transmitter have stored corresponding links between reference chip sequences and data symbols.

In the example, the receive chip sequence store 211 may store only a single data symbol chip sequence, namely that used to modulate the binary data symbols (and thus with the single stored data symbol chip sequence being equal to the chip sequence representing one binary data value and the inverse (typically sign inverted) chip sequence representing the other binary data value).

The load modulation receiver 207 is arranged to determine load modulation data symbols received from the power receiver in response to a correlation of the stored data symbol chip sequences and the load variations of the power transfer signal. Specifically, in some embodiments, the load modulation receiver 207 may correlate the determined load variation sequence provided by the load detector 209 with all the stored data symbol chip sequences to determine a correlation value for each. In cases, such as the described binary case where some sequences are the inverse of each other, only one correlation may be performed with the sign of the correlation value reflecting the two possible chip sequences.

Thus, the load modulation receiver 207 may correlate the receiver load variation sequence with the reference chip sequence(s) to determine a correlation value indicating how closely these match.

The load modulation receiver 207 may then determine the data symbol as one linked with the chip sequence for which the associated correlation value is sufficiently high.

Thus, the power receiver is capable of transmitting data to the power transmitter using load modulation with relatively long chip sequences for each data symbol. The approach may provide a substantially improved communication and operation in many embodiments. In particular, a substantially improved communication performance and reliability, and especially the symbol signal to noise ratio may be increased substantially. This may allow the modulation depth, and specifically the modulation load variations relative to the power transfer signal level/power transfer level, to be reduced substantially. Indeed, in many cases, the modulation depth may be reduced by a factor of 10, 100, or even higher. This may reduce and mitigate many of the disadvantages of using load modulation and may e.g. reduce electromagnetic interference, reduce electrical noise, reduce mechanical noise, prevent or mitigate spurious oscillations etc.

For example, using a chip rate corresponding to the bit rate used in Qi, which may be up to 2 kBps communication rate, the improvement in signal to noise ratio may be increased by an amount corresponding to the sequence length. For example, using bit lengths of 63 or 127 may increase the symbol energy to noise ratio by a corresponding amount allowing the modulation depth to correspondingly be reduced by a factor of 63 or 127 while maintaining the same bit error rate.

A disadvantage of such an approach may be that the effective communication rate may be reduced. For example, the use of sequence lengths of 63 or 127 may reduce the effective baud rate to 30.7 or 15.7 bps, respectively. In order to address this, the chip time interval duration may be reduced. The reduction may be a suitable trade-off between desired communication rate and bit error performance and can be selected for the specific application and implementation. Increasing the chip rate may have the effect that the required bandwidth and frequency spectrum of the load modulation may increase correspondingly, and potentially by a high amount. However, it is a particular advantage of the current approach that communication in a wireless power transfer system is typically not bandwidth restricted or even sensitive to the bandwidth of the communication and thus such an additional bandwidth may typically be available without impacting other functionality or performance.

In many embodiments, the system may be arranged to synchronize the load modulation communication to the power transfer signal/drive signal.

In many embodiments, the data transmitter 509 may specifically be arranged to synchronize the load modulation of the first chip sequence to the power transfer signal. The power transfer signal has an operating frequency which is typically in the range of 10 kHz-500 kHz and for Qi is often around 100 kHz. The data transmitter 509 may synchronize the chip time intervals to be synchronized to the oscillations and periods of the power transfer signal. For example, in many embodiments, the data transmitter 509 may use a chip duration/time interval which is a multiple of the power transfer signal period. Thus, each chip may have a duration that is a multiple of the period time of the power transfer signal, i.e. the duration of the chip interval may be N*T where N is an integer and T is the duration of a period of the power transfer signal/drive signal.

In many embodiments, the data transmitter 509 may not only synchronize the duration of the chip intervals to the durations of the periods of the power transfer signal but may also time the start and/or stop timings of the chips to the timing of the power transfer signal. Specifically, the transition times between chips may be synchronized to occur at zero crossings of the power transfer signal, or e.g. with a fixed offset relative to zero crossings of the power transfer signal. It will be appreciated that the synchronization may be based on the timing of the signal inducted in the receiver coil 107 by the power transfer signal.

Similarly, the data transmitter 509 may be arranged to generate the received chip sequence from samples of the loading of the power transfer signal (possible after matched filtering being applied).

The load detector 209 may specifically sample a signal of the output circuit that corresponds to the power transfer signal, such as a current and/or power of the drive signal, a relative phase between current and voltage of the drive signal, a current through the transmitter coil 103 etc. The load modulation receiver 207 may then generate the chip sequence to correspond to the load values for these sampling times, and may proceed to determine the correlation values by correlating the received chip sequence in the form of the sampled modulation load values with the reference values.

It will be appreciated that in some approaches, the correlation may be based on hard-decision values, i.e. a direct comparison of the chip values with hard decision received chip values may be used. In some embodiments, the decisions may for example be based on soft decision modulation load/chip values. For example, for a binary transmission approach, the reference chip sequences may be binary sequences comprising only two possible values. However, the received chip sequences may be represented by soft decision values, such as values directly indicating a measured modulation load value.

In many embodiments, the load detector 209 may be arranged to synchronize the sampling to the power transfer signal, and specifically this may be achieved by synchronizing it to the drive signal.

In many embodiments, the synchronization may be of the sampling such that e.g. one sample is made per chip (possibly after matched filtering). Especially, if the chip rate is equal to N times the period of the power transfer signal, the sampling may also be synchronized to be once every N times. Thus, in many embodiments, the synchronization may be such that the sampling rate is equal to the chip frequency of the load modulation.

In some embodiments, the sampling may be a two stage process where a number of samples are generated at a higher frequency and then decimated to given sample rate. For example, for a chip duration of ten times the period of the power transfer signal, the sampler may take one sample every period. An averaging filter may then add the last ten samples, i.e. it may be a square window FIR filter that sums the ten most recent samples (with equal weights). The output of the sampling may then be the sampled output of this filter, such as specifically the output of every tenth period which coincides with the filter being a summation of the ten periods falling within a single chip. Thus, effectively the sampling at the synchronized time instants may be achieved by a suitably synchronized decimation at the output of the filter.

In other embodiments, only a single sampling of the analog signal of the output circuit is performed per chip. In such a situation the timing of the sampling may for each sample be synchronized to occur in the center of the symbol duration.

In many embodiments, the operating frequency of the drive signal and the power transfer signal may thus be an integer multiple of the sampling rate of the sampling of the signal of the output circuit and/or an integer multiple of a chip frequency of the load modulation. The multiple may be the same and may specifically be one. Indeed, in many embodiments, the integer multiple is advantageously relatively low in order to allow efficient communication and a higher data rate. In many embodiments, the integer advantageously does not exceed 1, 3, 5, 10, or 20.

Synchronization of the load modulation to the power transfer signal may in many practical implementations allow an increase of the chip rate and/or bit rate because it enables a reduction of the amount of sampling the power transmitter has to perform. In the extreme case where the chip frequency is the same as the power transfer signal frequency, the power receiver may change the load according to the chip sequence every cycle of the power transfer signal. Alternatively, the power receiver might change the load according to the chip sequence every N-th cycle of the power signal, reducing the chip frequency by a factor N.

Synchronous modulation eases modulation detection at the power transmitter side by enabling this to apply a synchronous sampling technique and correlating the detected signal to the modulation sequence after that step. The approach may typically facilitate implementation substantially while achieving an efficient communication.

The length of the chip sequences may be selected to the specific preferences and requirements of the individual embodiment and may be selected to provide a suitable compromise between communication reliability and performance (e.g. bit rate), data rate, bandwidth, modulation depth and associated disadvantages etc. In most embodiments, a length of no less than 8 and/or no more than 64 chips will provide suitable and advantageous performance for wireless power transfer systems, such as specifically for Qi systems.

In many embodiments, the set of chip sequences may include only two chip sequences. In such examples, each symbol may be represented by one or the other chip sequence depending on the symbol value and thus each symbol may be a binary symbol (bit) and the communication may be a binary communication.

In some embodiments, the set of chip sequences may include more than two chip sequences and more than two different symbol values are possible. For example, in some embodiments, the set of chip sequences may comprise, say, three chip sequences allowing three different symbol values for each symbol being communicated by a chip sequence. In other embodiments, a larger number of sequences may be included allowing each chip sequence/data symbol to represent more data values thereby increasing the effective bit rate. Such an approach may in particular be suitable for longer chip sequences where larger differences in correlation values between chip sequences are feasible.

For example, for a chip length of 31 bits, 2147483648 different sequences are possible, and the system may select two sequences out of these that have high autocorrelation and low cross-correlation. Typically, the sequences may be selected as a sequence with very high auto-correlation and the binary inverse chip sequence as this will have the lowest cross-correlation (normalized cross correlation of −1 using binary values of −1 and 1). The two sequences may then be used for binary communication allowing high reliability as the correlation performed by the load modulation receiver 207 will generate substantially different correlation values for the two possible chip sequences being received.

The specific sequences and patterns used may depend on the preferences and requirements of the individual embodiment. Typically, the sequences are selected to provide good correlation properties, and specifically the set of chip sequences is selected to consists of sequences with high autocorrelation values and low cross-correlation values. In many embodiments, chip sequences may be selected as maximum length sequences. For example, in many embodiments, chip sequences may be selected as maximum length sequences generated from polynomial the polynomial order chosen by the power receiver in accordance with a desired/selected modulation depth and desired communication speed. Specifically, pseudo noise sequences developed for, and used in, direct sequence spread spectrum communication and code division multiple access systems may tend to also be suitable for the described approach.

As previously mentioned, the set of sequences may comprise mirror image or inverted chip sequences, i.e. for a given binary chip sequence, the set of chip sequences may also include the chip sequence for which all chips have the complementary value. For example, if the load values are represented by 1 and −1, the set of chip sequences may for each chip sequence also include the chip sequence resulting from a multiplication by −1 (equivalent to swapping between 0 and 1 for all chips for a chip sequence represented by the values of 1 and 0). Indeed, in some embodiments, the set of chip sequences may comprise only a chip sequence and the inverted chip sequence. It will be appreciated that in such embodiments, only a single representation needs to be stored to represent a pair of a chip sequence and the inverted chip sequence.

Such an approach may be particularly suitable for many applications and may result in good performance and low complexity. For example, a single correlation between a received chip sequence and a reference chip sequence can provide a correlation value for both the reference chip sequence and for the inverse chip sequence. Indeed, if there is no noise, the correlation value for one of the reference chip sequences may be +1 and the correlation value for the inverse reference chip sequence will then by −1. Thus, a single correlation value applicable to two symbol values/sequences can be determined and directly be used to select between the two symbols.

It will be appreciated that the approach of using inverted reference chip sequences can be considered equal to a multiplication of the binary data symbol and a single reference chip sequence (using the values of 1 and −1 to represent the binary values).

As a specific example, the system may employ the following approach:

1. The power receiver reduces the depth of load modulation significantly so that spurious oscillations do not occur, electrical and acoustic noise is reduced etc.

2. The power receiver encodes individual bits as direct (e.g., pseudorandom) chip sequences with steep autocorrelation functions.

3. The power receiver manipulates the load (typically changes the load or detunes the resonance circuit) synchronously with the power transfer signal (e.g., a transition per power signal cycle or a transition every multiple power signal cycles).

4. The power transmitter measures the load changes, e.g., by measuring the transmitter coil voltage or coil current, with a sampling time that is synchronized to the power transfer signal (e.g., one sample per power signal cycle, multiple samples per power signal cycle, or one sample per multiple power signal cycles).

5. The power transmitter decodes the data by correlating the digitized samples with the chip sequence according to which the data was modulated.

6. The chip sequence and the number of power signal cycles per symbol may be known by the power receiver and the power transmitter a priori.

An advantage of the described approach is that it provides improved backwards compatibility in many scenarios and require relatively little modifications to many power transfer systems. For example, a Qi power transfer system already uses load modulation and relatively little modification may be required to support the approach described hereinabove.

Further, in many embodiments, functionality may be included that further improves backwards compatibility and which specifically may enable communication with legacy devices.

However, the Inventors have realized that a critical factor of the load modulation operation in wireless power transfer system as described is the detection of data being present and the synchronization of the chip sequences to each other. Typically, the power transmitter may not know exactly when data is being transmitted or exactly when chip sequences start or stop. Indeed, whereas the chip synchronization to the power transfer signal/drive signal may provide improved performance, e.g. allowing only a single load value sample to be taken per chip time, this may provide no information on when chip sequences are applied, i.e. when chip sequences start and stop. Thus, the data symbol timing may be uncertain.

Accordingly, a receiver can continuously apply the chip sequences for every new chip period until a sufficiently high correlation is achieved and use this as an indication that a new data symbol has been detected, thereby providing data symbol timing via the symbol detection. However, such an approach of trying to detect a data symbol for each new chip period increases the risk of false detections and may lead to errors in the data detection/demodulation.

In the system of FIGS. 1, 2 and 5, an improved approach is implemented.

The power receiver 105 specifically further comprises a preamble transmitter 515 which is arranged to transmit a preamble by load modulating the power transfer signal by load variations corresponding to the second chip sequence. The preamble transmitter 515 is specifically coupled to the chip sequence store 511 and the load modulator 513 and is arranged to retrieve a preamble chip sequence from the chip sequence store 511 and to control the load modulator 513 to load modulate the power transfer signal to apply the load variations to the power transfer signal in accordance with the preamble chip sequence. The preamble transmitter 515 may accordingly apply a load variation sequence in accordance with the preamble chip sequence. This load variation sequence is in the system used as a preamble to subsequent data transmission.

The term preamble may refer to a synchronization sequence transmitted by the power receiver in connection with a transmission of data. The term "preamble" may include, and throughout may be replaced by, the term "synchronization sequence". The term "preamble chip sequence" may include, and throughout may be replaced by, the term "synchronization chip sequence".

The power receiver furthermore comprises a power receiver synchronizer 517 which is arranged to synchronize the transmission of the preamble and the data symbol transmission, and specifically is arranged to control the preamble transmitter 515 to transmit the preamble prior to the subsequent transmission of one or more data symbols by the data transmitter 509. Thus, the power receiver synchronizer 517 may control the preamble transmitter 515 and the data transmitter 509 such that a data transmission of one or more data symbols/bits (e.g. a data packet) is preceded by the transmission of a preamble.

In many scenarios, the power receiver synchronizer 517 may also synchronize the transmissions such that there is a fixed and typically predetermined time offset between the transmission of the preamble and the transmission of data symbols, i.e. between the modulation by the preamble chip sequence and by the data symbol chip sequences. In many embodiments, such a time offset may be zero such that the data symbol chips directly follow the preamble chip sequence. For example, the periodic chip timing, and specifically the chip synchronization to the power transfer signal, may be maintained across the transmission of the preamble chip sequence and the transmission of the data symbol chip sequences. Further, the last chip of the preamble chip sequence may be immediately followed by the first chip of the first data symbol chip sequence.

Each data symbol chip sequence corresponds to a data symbol time interval, i.e. in each data symbol time interval, a data symbol chip sequence is transmitted/loaded onto the power transfer signal. Thus, the synchronization of the data symbol chip sequences to the preamble chip sequence corresponds to an alignment and synchronization of the data symbol time intervals to the transmission of the preamble chip sequence. timing of the transmission of the preamble. The data transmitter 509 of FIG. 5 is accordingly arranged to apply the sequence of modulation load values corresponding to the data symbol chip sequence to the data symbol time intervals, and to align these data symbol time intervals to a timing of the transmission of the preamble.

In the approach, different lengths are used for the preamble chip sequence and for the data symbol chip sequences. In particular, the length of the preamble chip sequence is longer than the length of the data symbol chip sequences, and typically is no less than twice as long. The length of the preamble chip sequence is thus substantially longer than the length of the data symbol chip sequences.

For example, in the specific example, the data symbol chip sequences may have a length of 31 chips whereas the preamble chip sequence has a length of 63 chips (or possibly 127 chips in some cases).

In the example, the receive chip sequence store 211 of the power transmitter 101 stores not only the data symbol chip sequences but also the preamble chip sequence.

The power transmitter 10 comprises a preamble presence detector 213 which is coupled to the receive chip sequence store 211 and the load detector 209. The preamble presence detector 213 retrieves the preamble chip sequence from the receive chip sequence store 211 and receives the load sequence from the load detector 209.

The preamble presence detector 213 is arranged to correlate the preamble chip sequence and the load variations to determine a correlation value. The preamble presence detector 213 may proceed to perform such a correlation once every chip time interval. Specifically, during a time interval in which no data is being received, the preamble presence detector 213 may continuously determine preamble correlation values for each chip time interval where the preamble correlation value for a given timing is indicative of a correlation between the preamble chip sequence and the load variation sequence. In some embodiments, the correlation value may be an absolute value of the preamble value.

Correlation is a well-known approach for determining the similarity between two aligned sequences/signals. In the analogue domain, correlation between two signals may for example be determined as:

$$r(\tau) = \int_{-T_1}^{T_2} x(t) \cdot y(t - \tau) dt$$

where τ represents the time alignment/offset between the signals and $T_1$ and $T_2$ are suitable limits for evaluating the signals (which in principle and theoretically may be infinite but in practice are selected to provide the desired performance).

In the digital domain, correlation is between two sequences of values, of which one or both may be sample values of a signal. For example, correlation may be performed by evaluating the function:

$$r(l) = \sum_{n=-N_1}^{N_2} x(n) y(n-l)$$

where similarly $N_1$ and $N_2$ are suitable limits for evaluating the signals/sequences (which in principle and theory may be infinite but in practice are selected to provide the desired performance). The correlation may be dependent on the alignment between the sequences as represented by the variable l in the above equation.

It will be appreciated that in many scenarios, correlations are determined as normalized correlations.

A correlation value may thus in many cases be determined as a combination (often summation) of the results of element pair operations (typically multiplication) between corresponding elements of two sequences for a given time offset/alignment of the two sequences.

In the described approach, chip sequences are correlated with load variation sequences being samples of load variations of the power transfer signal. The correlation is performed for a given time offset/alignment between the chip sequence and the load variations (specifically the load variation sample sequence) to determine a correlation value. The correlation may be performed repeatedly with different time offsets/alignments. For example, for preamble detection the correlation may continuously be performed with an alignment that is increased by one sample time every time a new load sample is received. Thus, the load variation signal is for each new measurement/sample continuously correlated with the preamble chip sequence to detect if a match is present. The power transfer signal is accordingly continuously monitored to detect if a preamble is considered present (as this is likely to result in a high correlation value for this time offset).

The preamble presence detector 213 is arranged to evaluate the correlation values and specifically to compare them to a preamble detection threshold. If the correlation is performed when the load variation sequence corresponds to the transmitted preamble from the preamble transmitter 515, the load variations will match the preamble chip sequence and thus a relatively high correlation value will be generated. If the correlation is performed when the load variation sequence does not match the transmitted preamble, a low correlation with the preamble chip sequence will be present and a low correlation value will be generated.

The preamble presence detector 213 is arranged to consider that a preamble has been detected if the correlation value exceeds the preamble detection threshold. Thus, the preamble presence detector 213 may during a time of no data symbols being received continuously monitor the load variations to detect if a preamble is being received.

The power transmitter 101 further comprises a power transmitter synchronizer 215 which is coupled to the preamble presence detector 213 and the first communicator 207. If a preamble detection is generated by the preamble presence detector 213, the power transmitter synchronizer 215 is provided with an indication of the detection. The power transmitter synchronizer 215 is arranged to synchronize the data symbol time intervals for the load modulation receiver 207 in response to the timing of the preamble detection. The power transmitter synchronizer 215 may control the load modulation receiver 207 to apply the correlation with the data symbol chip sequences to be aligned with these data symbol time intervals. Each data symbol time interval may have a duration equal to a duration of a data symbol chip sequence.

Thus, rather than apply the data symbol chip sequence correlation for every chip interval, the correlation is aligned with the data symbol time intervals. Specifically, the correlation is performed with the data symbol chip sequences being within the data symbol time intervals. The correlation is specifically such that a start of the data symbol chip sequence aligns with a start of the data symbol time interval and/or such that an end of the data symbol chip sequence aligns with an end of the data symbol time interval.

The detection of the preamble is thus used to synchronize the data symbol time intervals of the load modulation receiver 207 when performing the correlation such that this corresponds to the data symbol timing that was used by the power receiver. Thus, the data symbol correlation is not performed for all chip interval timings but is only performed once per data symbol time interval. This may substantially reduce the risk of a data symbol error resulting from noise. The probability of false detections of data being transmitted may be substantially reduced.

Figure 8:
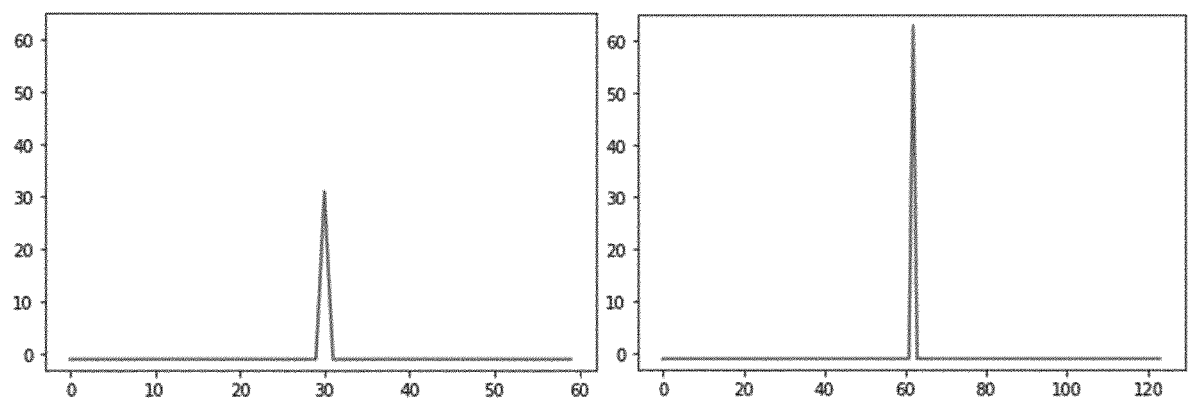
FIG. 8 illustrates an example of autocorrelations.

Further, as the length of the preamble chip sequence is substantially longer than the data symbol chip sequences (typically no less than twice as long), the probability of detecting the preamble correctly is substantially increased in comparison to a correct detection of a data symbol. The probability of not only correctly detecting the start of a new data transmission but also of detecting and applying the correct data symbol timing when receiving data is very substantially increased. Indeed, as illustrated in FIG. 8, the correlation peak increases substantially for increased chip sequence length. Indeed, applying the described approach and increasing the chip sequence length from 31 to 63 bits tend to decrease the probability of detection errors, and even of the overall achievable bit error rate, by several orders of magnitude.

In the described approach, chip sequences are accordingly used to provide highly efficient communication in a wireless power transfer system. Further, the system employs a preamble synchronization approach and further switches between one chip sequence length for the preamble and a shorter sequence length for the data symbols.

Thus, in the approach, the power transmitter and the power receiver are arranged to switch the correlation between different chip sequences with different length depending on whether a data symbols are being communicated or whether a preamble is transmitted or attempted to be detected. Specifically, the power transmitter and the power receiver may be arranged to switch from a preamble chip sequence to a data symbol chip sequences when a preamble has been detected/transmitted.

It will be appreciated that in many embodiments, the data symbols may be transmitted directly after the (synchronization) preamble, and specifically the last chip of the preamble sequence may directly be followed by the first bit of the first data value. Similarly, subsequent data symbol time intervals may follow each other directly such that the last chip of one data symbol is directly followed by the first chip of the subsequent data symbol without any interval. However, it will be appreciated that in some embodiments, known/predetermined intervals may be present between different sequences.

Specifically, the power transmitter synchronizer 215 may be arranged to determine the data symbol time intervals as repeating time intervals that have a known/predetermined duration, and typically with this duration being equal to the duration of the data symbol chip sequences. Furthermore, there may be a predetermined time offset from the time of the preamble detection, when the preamble chip sequence is aligned with the preamble, to the start of the first data symbol time interval. This predetermined time offset may often be zero.

As previously described, the load modulation receiver 207 may be arranged to determine the symbol values in response to a detection of whether the correlation value between the corresponding data symbol chip sequence is above a symbol detection threshold or not.

In some embodiments where binary data communication is used, the load modulation receiver 207 may simply be arranged to determine the symbol value to correspond to the sign of the correlation value for a single data symbol chip sequence. Indeed, in the case where the chip sequences for the two binary values are the inverse of each other, the correlation may directly indicate the symbol value. Further, the detection may for each data symbol time interval determine the data value to correspond to the sign of the correlation value without requiring any specific threshold to be applied. In other embodiments, it may be required that the absolute value of the correlation value exceeds a threshold, but this may be substantially lower than the threshold for detecting the preamble.

In many embodiments, the chip rates for the preamble chip sequence and for the data symbol chip sequences may be the same. This may typically allow facilitated implementation and may e.g. facilitate reuse of the same functionality for correlations to the different sequences. For example, a generic correlator may be reconfigured simply by changing the chip sequence and changing the length of the correlation.

However, in some embodiments, the chip rates for the preamble chip sequence and for the data symbol chip sequences may be different.

Specifically, in some embodiments, the chip rate for the preamble chip sequence may be lower than the chip rate for the data symbol chip sequences. This may be particularly advantageous in embodiments that are computationally resource limited. A correlation operation is typically resource demanding as it typically requires a multiplication and addition operation for each chip. Accordingly, as the chip length for the preamble correlation is substantially longer than for the data symbol chip sequences, the correlation may for a limited computational resource take longer to perform. In order to allow for such low computational resource implementations, the system may reduce the chip rate for the preamble transmission.

In other embodiments, the chip rate for the preamble chip sequence may be higher than for the data symbol chip sequences. Indeed, if the correlation resource is not a limitation, the chip rate for the preamble chip sequence may be increased such that the time and overhead required for transmitting the preamble may be reduced thereby reducing e.g. communication delays.

In some embodiments, the preamble presence detector 213 may be arranged to perform the preamble detection using a two stage approach. Specifically, rather than performing a full preamble chip sequence correlation for every chip time interval, a correlation may be performed with a shorter sequence formed by a subset of the preamble chip sequence and only if a correlation value of this correlation exceeds a threshold will a full correlation with the preamble chip sequence be performed.

The preamble presence detector 213 may specifically be arranged to correlate the load variations of the power transfer signal with a subset chip sequence that is a subset of the preamble chip sequence. The subset chip sequence may be generated as a shorter chip sequence which is formed by a subset of the chips of the preamble chip sequence. Thus, rather than correlate the load variation values with the preamble chip sequence for all chips, an initial correlation is generated by performing an initial correlation which only includes some of the chips of the preamble chip sequence.

The subset chip sequence may be substantially shorter than the preamble chip sequence and indeed may typically have the same length as the data symbol chip sequences. In many embodiments, the length of the subset chip sequence is no longer than half, or a quarter of a length of the preamble chip sequence. For example, in the specific example, the preamble chip sequence may have a length of 63 ort 127 chips and the subset chip sequence may have a length of 31 chips, equal to the length of the data symbol chip sequences.

The subset chip sequence may be a sequence which is selected from the preamble chip sequence such that the selected chips form a subset chip sequence with a strong auto-correlation (and low cross-correlation to other possible load variations, such as specifically to the data symbol chip sequences). Further, the subset chip sequence need not be generated as a contiguous sub-sequence of the preamble chip sequence. Rather, in many embodiments, the subset chip sequence may comprise at least some non-contiguous chips of the preamble chip sequence. For example, the subset chip sequence may be selected to be formed by chip 1,2,3,10,11,20, . . . etc of the preamble chip sequence. The initial correlation may then generate the initial correlation value by correlating chip 1 of the current load variation sequence with chip 1 of the preamble chip sequence, chip 2 of the current load variation sequence with chip 2 of the preamble chip sequence, chip 3 of the current load variation sequence with chip 3 of the preamble chip sequence, chip 10 of the current load variation sequence with chip 10 of the preamble chip sequence, etc. Thus, rather than correlating all the chips of the preamble chip sequence with corresponding chips of the load variation sequence only some of these chips will be considered for the initial correlation.

The subset chip sequence may as mentioned be selected to have a high auto-correlation. Indeed, the subset chip sequence may be a subset of the preamble chip sequence that has an autocorrelation which is higher than the autocorrelation of any chip sequence of contiguous chips of the preamble chip sequence of the same length. Non-contiguous bits may be selected for the subset chip sequence such that this has a higher auto-correlation than if any series of consecutive bits in the preamble chip sequence were selected.

Such a subset chip sequence may typically provide substantially improved performance with a more accurate initial detection. Further, this can be achieved without significant disadvantages as the correlation of non-contiguous bits is typically not any more difficult or problematic than a correlation with contiguous bits.

The computational resource required for the initial correlation may be substantially lower than required for the full correlation. This may allow the initial correlation to be performed for e.g. each chip interval without requiring the computational resource necessary for a full preamble chip sequence correlation at every chip interval.

The initial correlation value may be compared to a suitable initial threshold. If the threshold is not exceeded, it is considered highly likely that no preamble is currently received, and no further processing is performed for this chip interval. However, if the threshold is exceeded, it is considered likely, or at least reasonably possible, that a preamble is currently received. Accordingly, the preamble presence detector 213 may proceed to perform the full preamble chip sequence correlation and preamble detection for the current chip interval as previously described.

Thus, in the approach the preamble presence detector 213 may be arranged to only initiate the full correlation of the load variations of the power transfer signal with the preamble chip sequence if indeed the initial correlation with the subset chip sequence results in a correlation value that exceeds the detection threshold. Otherwise, no further action is performed.

The shorter length correlation and initial detection is generally less accurate than the full correlation. The threshold may however accordingly be set lower such that the likelihood of missing a preamble is sufficiently low. This will typically result in a number of false initial detections where no preamble is present. However, by subsequently performing the full preamble chip sequence correlation and detection, most such false detections can be detected and will not result in a preamble detection. Rather, the full preamble chip sequence correlation is required to be sufficiently high for there to be a match.

The approach may typically provide the same detection accuracy as performing the full preamble chip sequence correlation for all chip sequences. However, it may typically be achieved with a substantially reduced average computational resource usage. The detection threshold may specifically in the individual embodiment be selected to provide the desired trade-off between computational resource usage and the risk of missing any preambles.

In the described approach, the detection of the preamble is based on comparing the correlation value to a preamble detection threshold. In many embodiments, such a threshold may be fixed and/or predetermined. However, in other embodiments, the threshold may be dynamic and may be dependent on various operational properties.

In particular, in some embodiments, the preamble presence detector 213 may be arranged to generate a noise estimate for the power transfer signal. It will be appreciated that many different approaches are known for generating noise estimates and that any suitable approach may be used to determine such a noise estimate.

In such embodiments, the preamble presence detector 213 may be arranged to dynamically adapt the preamble detection threshold in response to the noise estimate. For example, for a high noise level, the detection threshold may be increased in order to reduce the risk of false detections. In other embodiments, the threshold may be decreased in order to reduce the risk of missing a preamble.

A modulation load may be a load component of the loading of the power transfer signal/drive signal caused by/depending on/varying with the load modulation.

The preamble detection may be indicative of a preamble transmitted from the power receiver being received. In the application, the term "preamble" may be replaced by the term "synchronization sequence". In the application, the term "preamble chip sequence" may be replaced by "synchronization chip sequence".

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent clam but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

Generally, examples of a power transmitter, a power receiver, and methods of operation therefor, which implement an approach two wireless power transfer are indicated by below embodiments.

EMBODIMENTS

1. A power transmitter (101) for wirelessly providing power to a power receiver (105) via an inductive power transfer signal; the power transmitter (101) comprising:
an output circuit (203, 103) comprising a transmitter coil (103) arranged to generate the power transfer signal in response to a drive signal being applied to the output circuit (203, 103);
a driver (201) arranged to generate the drive signal;
a load detector (209) for detecting load variations for the power transfer signal;
a store (211) for storing a first chip sequence and a second chip sequence, the second chip sequence having a length exceeding a length of the first chip sequence;
a preamble presence detector (213) arranged to correlate the second chip sequence with load variations of the power transfer signal to generate detection correlation values and to generate a preamble detection in response to a detection correlation value exceeding a preamble detection threshold;
a load modulation receiver (207) arranged to determine load modulation data symbols received from the power receiver (105) following the preamble detection in response to a correlation of the first chip sequence and load variations of the power transfer signal;
a synchronizer (215) arranged to synchronize data symbol time intervals for the load modulation receiver (207) in response to a timing of the preamble detection, and wherein the load modulation receiver (207) is arranged to align the correlation of the first chip sequence and load variations of the power transfer signal to the data symbol time intervals.

2. The apparatus of embodiment 1 wherein the synchronizer (215) is arranged to determine the data symbol time intervals as repeating time intervals having a duration equal to a duration of the first chip sequence and having a predetermined time offset to the preamble detection.

3. The apparatus of any previous embodiment wherein the length of the second chip sequence is no less than twice the length of the first chip sequence.

4. The apparatus of any of the previous embodiment wherein a chip rate for the first chip sequence is higher than a chip rate for the second chip sequence.

5. The apparatus of any of the previous embodiments 1-3 wherein a chip rate for the first chip sequence is lower than a chip rate for the second chip sequence.

6. The apparatus of any of the previous embodiment wherein the load modulation receiver (207) is arranged to determine a first received data symbol value if the correlation value for the correlation of the first chip sequence and load variations of the power transfer signal in a first data symbol time interval exceeds a data symbol threshold, the data symbol threshold being lower than the preamble detection threshold.

7. The apparatus of any of the previous embodiment wherein the modulation receiver (207) is arranged to determine binary data symbol values corresponding to a sign of the correlation of the first chip sequence and load variations of the power transfer signal in the data symbol time intervals.

8. The apparatus of any of the previous embodiment wherein the preamble presence detector (213) is arranged to correlate load variations of the power transfer signal with a third chip sequence being a subset of the second chip sequence, and to initiate a correlation of the power transfer signal with the second chip sequence in response to a detection that a correlation value for the correlation between load variations of the power transfer signal with a third chip sequence exceeds a detection threshold.

9. The apparatus of embodiment 8 wherein the third chip sequence is a subset of the second chip sequence having an autocorrelation higher than any autocorrelation of any chip sequence of contiguous chips of the second chip sequence with a length equal to a length of third chip sequence.

10. The apparatus of any of the previous embodiment wherein the preamble presence detector (213) is arranged to synchronize the second chip sequence to the drive signal when correlating the second chip sequence with load variations of the power transfer signal.

11. The apparatus of any of the previous embodiment wherein the preamble presence detector (213) is arranged to generate a noise estimate for the power transfer signal, and to adapt the preamble detection threshold in response to the noise estimate.

12. A power receiver (105) for wirelessly receiving power from a power transmitter (101) via an inductive power transfer signal; the power receiver (105) comprising:
- an input circuit (107, 503) comprising a receiver coil (107) arranged to extract power from the power transfer signal;
- a store (511) arranged to store a first chip sequence and a second chip sequence, the second chip sequence having a length exceeding a length of the first chip sequence;
- a preamble transmitter (515) arranged to transmit a preamble by load modulating the power transfer signal by load variations corresponding to the second chip sequence;
- a data transmitter (509) arranged to transmit data symbols to the power transmitter (101) by load modulating the power transfer signal following transmission of the preamble, at least one data symbol being represented by a sequence of modulation load values corresponding to the first chip sequence;
- a synchronizer (517) arranged to synchronize data symbol time intervals for the data transmitter (509) with a timing of the transmission of the preamble, and
wherein the data transmitter (509) is arranged to align the sequence of modulation load values corresponding to the first chip sequence to the data symbol time intervals.

13. A wireless power transfer system comprising a power transmitter (101) according to any of the previous embodiments 1 to 11 and a power receiver (105) according to embodiment 12.

14. A method of operation for a power transmitter (101) wirelessly providing power to a power receiver (105) via an inductive power transfer signal; the power transmitter (101) comprising: an output circuit (203, 103) comprising a transmitter coil (103) arranged to generate the power transfer signal in response to a drive signal being applied to the output circuit (203, 103); the method comprising
- generating the drive signal;
- detecting load variations for the power transfer signal;
- correlating a second chip sequence with load variations of the power transfer signal to generate detection correlation values, the second chip sequence having a length exceeding a length of a first chip sequence;
- generating a preamble detection in response to a detection correlation value exceeding a preamble detection threshold;
- determining load modulation data symbols received from the power receiver (105) following the preamble detection in response to a correlation of the first chip sequence and load variations of the power transfer signal;
- synchronizing data symbol time intervals in response to a timing of the preamble detection, and
- aligning the correlation of the first chip sequence and load variations of the power transfer signal to the data symbol time intervals.

15. A method of operation for a power receiver (105) wirelessly receiving power from a power transmitter (101) via an inductive power transfer signal; the power receiver (105) comprising:
- an input circuit (107, 503) comprising a receiver coil (107) arranged to extract power from the power transfer signal;
and the method comprising:
- transmitting a preamble by load modulating the power transfer signal by load variations corresponding to a second chip sequence the second chip sequence having a length exceeding a length of a first chip sequence;
- transmitting data symbols to the power transmitter (101) by load modulating the power transfer signal following transmission of the preamble, at least one data symbol being represented by a sequence of modulation load values corresponding to the first chip sequence;
- synchronizing data symbol time intervals for the data transmitter (509) with a timing of the transmission of the preamble, and
- aligning the sequence of modulation load values corresponding to the first chip sequence to the data symbol time intervals.

The invention claimed is:

1. A device comprising:
an output circuit comprising:
a transmitter coil, wherein the transmitter coil is arranged to generate a power transfer signal in response to a drive signal;
a driver circuit, wherein the driver circuit is arranged to generate the drive signal; and
a load detector circuit, wherein the load detector circuit is arranged to detect a plurality of load variations of the power transfer signal;
a storage circuit,
wherein the storage circuit is arranged to store a first chip sequence and a second chip sequence,
wherein the first chip sequence has a first length,
wherein the second chip sequence has a second length,
wherein the second length is greater than the first length;
a preamble presence detector circuit,
wherein the preamble presence detector circuit is arranged to correlate the second chip sequence with the plurality of load variations of the power transfer signal so as to generate detection of a plurality of correlation values,
wherein the preamble presence detector circuit is arranged to detect a preamble in response to a detection correlation value exceeding a preamble detection threshold;
a load modulation receiver circuit, wherein the load modulation receiver circuit is arranged to determine load modulation data symbols following the detection of the preamble based on a correlation of the first chip sequence and the plurality of load variations of the power transfer signal;
a synchronizer circuit,
wherein the synchronizer circuit is arranged to synchronize a plurality of data symbol time intervals for the load modulation receiver circuit in response to a timing of the detection of the preamble,
wherein the load modulation receiver circuit is arranged to align the correlation of the first chip sequence and the plurality of load variations of the power transfer signal to the plurality of data symbol time intervals.

2. The apparatus of claim 1,
wherein the synchronizer circuit is arranged to determine the plurality of data symbol time intervals as repeating time intervals,
wherein the repeating time intervals have a duration equal to a duration of the first chip sequence,
wherein the repeating time intervals have a predetermined time offset to the detection of a preamble.

3. The apparatus of claim 1, wherein the second length no less than twice the first length.

4. The apparatus of claim 1,
wherein the first chip sequence has a first chip rate, wherein the second chip sequence has a second chip rate,
wherein the first chip rate is greater than the second chip rate.

5. The apparatus of claim 1,
wherein the first chip sequence has a first chip rate,
wherein the second chip sequence has a second chip rate,
wherein the first chip rate is smaller than the second chip rate.

6. The apparatus of claim 1,
wherein the plurality of correlation values comprises a first correlation value,
wherein the load modulation receiver circuit is arranged to determine a first received data symbol value if the first correlation value in a first data symbol time interval exceeds a data symbol threshold,
wherein the data symbol threshold is lower than the preamble detection threshold.

7. The apparatus of claim 1, wherein the modulation receiver is arranged to determine binary data symbol values corresponding to a sign of the correlation of the first chip sequence and the plurality of load variations of the power transfer signal in the plurality of data symbol time intervals.

8. The apparatus of claim 1,
wherein the preamble presence detector circuit is arranged to correlate the plurality of load variations of the power transfer signal with a third chip sequence,
wherein the third chip sequence is a portion of the second chip sequence,
wherein the preamble presence detector circuit is arranged to initiate a correlation of the power transfer signal with the second chip sequence in response to a detection that a correlation value for the correlation between the plurality of load variations of the power transfer signal with a third chip sequence exceeds a detection threshold.

9. The apparatus of claim 8,
wherein the third chip sequence is a portion of the second chip sequence having an autocorrelation higher than any autocorrelation of any chip sequence of contiguous chips of the second chip sequence with a length equal to a length of third chip sequence.

10. The apparatus of claim 1, wherein the preamble presence detector circuit is arranged to synchronize the second chip sequence to the drive signal when correlating the second chip sequence with the plurality of load variations of the power transfer signal.

11. The apparatus of claim 1,
wherein the preamble presence detector circuit is arranged to generate a noise estimate for the power transfer signal,
wherein the preamble presence detector circuit is arranged to adapt the preamble detection threshold in response to the noise estimate.

* * * * *